No. 722,732. PATENTED MAR. 17, 1903.
W. T. MAKEPEACE.
TINE AND CRANBERRY SCOOP.
APPLICATION FILED JULY 23, 1900.
NO MODEL. 2 SHEETS—SHEET 1.
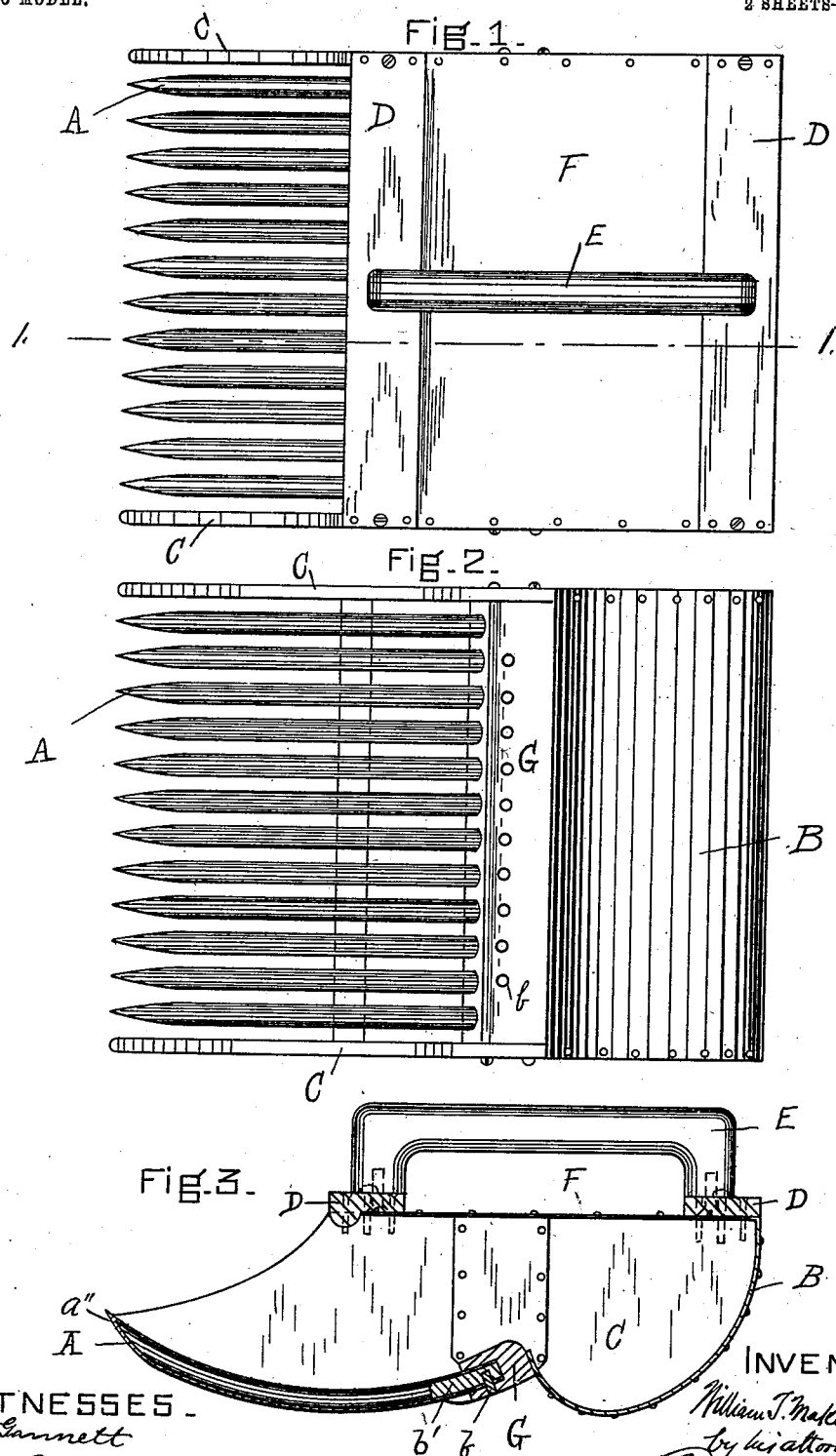

No. 722,732. PATENTED MAR. 17, 1903.
W. T. MAKEPEACE.
TINE AND CRANBERRY SCOOP.
APPLICATION FILED JULY 23, 1900.
NO MODEL. 2 SHEETS—SHEET 2.

WITNESSES.
C. H. Gannett.
E. A. Allen.

INVENTOR.
William T. Makepeace
by his attorney
Edward S. Beach.

UNITED STATES PATENT OFFICE.

WILLIAM T. MAKEPEACE, OF MARSTONS MILLS, MASSACHUSETTS.

TINE AND CRANBERRY-SCOOP.

SPECIFICATION forming part of Letters Patent No. 722,732, dated March 17, 1903.

Application filed July 23, 1900. Serial No. 24,496. (No model.)

*To all whom it may concern:*

Be it known that I, WILLIAM T. MAKEPEACE, a citizen of the United States, residing at Marstons Mills, in the county of Barnstable and State of Massachusetts, have invented certain new and useful Improvements in Tines and Cranberry-Scoops, of which the following is a specification, reference being had therein to the accompanying drawings.

The object of my invention is to increase both the gathering capacity of cranberry-scoops and the ease with which they are operated, and its attainment depends upon the stiffness, strength, and weight of the tines employed—that is, upon the attainment of a greater length and diameter of tine than heretofore known. For instance, while as between an iron and a wooden tine of the same size the former is the stronger, yet to be successfully used in a cranberry-scoop not only must its weight be reduced by diminishing its diameter, but its length must be shortened to obtain such stiffness as will not during the operation of lifting the scoop up out of the vines permit the tines to separate enough to allow the berries to fall out between them or when suddenly released from the tangle to snap the berries out of the scoop into the bog. While wooden tines of the desired stiffness are longer than iron, they are not long enough and cannot be so made, because of the ease with which they are broken. As compared with wooden tines heretofore used in cranberry scoops or gatherers, tines of iron weigh about the same, for they have smaller diameters in order to secure the requisite lightness in weight, and hence such scoops have been generally made with a considerable number of metal tines set very close together, and they are therefore objectionable, for to gather or comb out berries with a scoop of many tines much more physical exertion is required than would be required were the tines fewer and larger in diameter. It is to be borne in mind that cranberries are customarily gathered by men, women, and children working through the bogs on hands and knees. In fine, iron tines are objectionable, because of their shortness and greater number, while those of wood lack both the desired strength and length.

Figure 4:
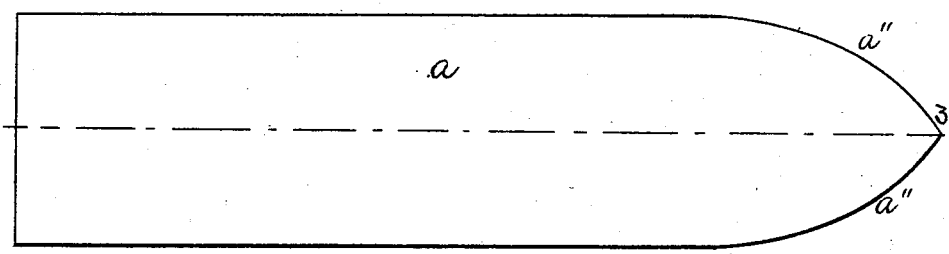
Figure 7:
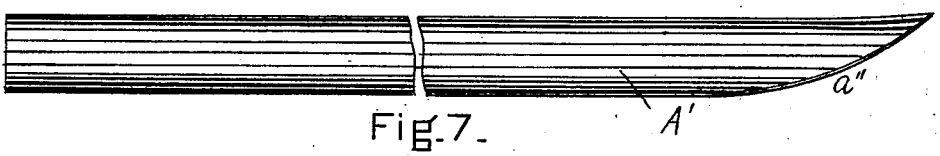
Figure 8:
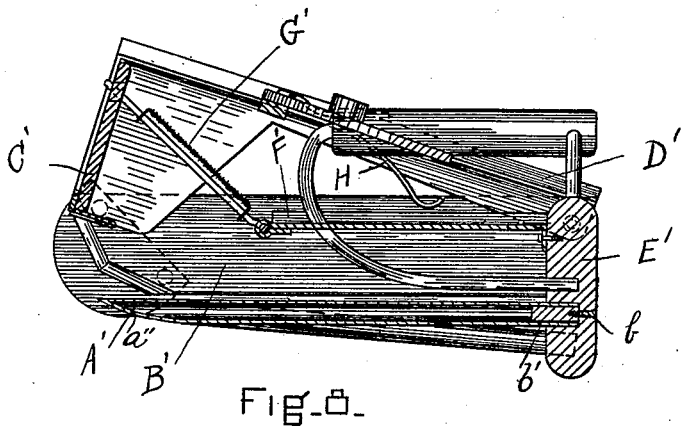
Figure 5:
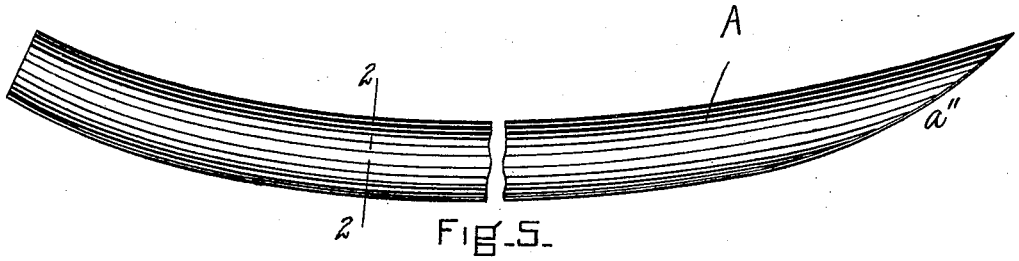
Figure 6:

Figure 1 is a top view of my improved cranberry scoop or gatherer. Fig. 2 is a bottom view of same. Fig. 3 is a longitudinal section of same on line 1 1 in Fig. 1. Fig. 4 is a plan view of sheet-metal tine-forming blank. Fig. 5 is a side view of my improved tine longitudinally curved. Fig. 6 is a cross-section of same on line 2 2 of Fig. 5. Fig. 7 is a side view of a modification of my improved tine longitudinally straight, and Fig. 8 is a longitudinal section of a modification of my improved cranberry scoop or gatherer.

In the drawings illustrating the principle of my invention and the best mode now known to me of applying that principle, A, Fig. 5, and A', Fig. 7, are different forms of my improved tine. The form A is hollow and curves downwardly from its butt-end and thence upwardly to its pointed or working end. It is made from thin sheet metal. A flat blank $a$ (shown in Fig. 4) is cut therefrom and then molded into form over a mandrel having the desired shape, the longitudinal edges of the blank overlapping, as at $a'$, and being secured together by solder. The front end of the blank is so tapered on each side of its central longitudinal axis 3 3 that when the margins are brought together the free end of the tine slants upward from the under side of the tine to its top surface, as indicated by $a''$. These tines may be stamped out by machinery, but I find the above method satisfactory. This tubular construction allows a tine to be longer, larger in diameter, and lighter in weight than does any construction of which I am aware.

The tines A and the curved metal plate B form the bottom and back of the scoop. There are two sides C, secured to the bottom and back of the scoop and braced at the top by two cross-pieces D, to which the handle E is fixed.

F is a top, preferably of some flexible material.

A cross-bar G extends across the bottom of the scoop from one to the other of the sides C. From this cross-bar G extends a series of hollow metallic tines A in parallel lines, conforming to the curvature of the bottom edges of the sides C. These tines are secured to the cross-bar G in the usual manner by pins $b$, the open ends of the tines being plugged for a short distance with plugs $b'$.

In practical operation the scoop is held by the handle and the front ends of the tines dipped and thrust into the mass of vines under the berries and then raised, with the effect that the teeth receive a large number of berries, which roll into the receptacle. It will now be obvious that there will be a great strain upon the tines during the operation of lifting and raising them out of the vines and that only their strength and great stiffness permits them to be made longer than those heretofore used, and thus enable a greater number of berries to be combed out of the vines at each operation than could be gathered with a scoop employing the old tines, which were they too long would likely catch in the vines and so bend as to allow the berries to fall out between them or when released from the tangle to snap back with such vim into their normal position as to throw some of the berries out of the scoop. Further, it will be plain that by reason of the fact that my tines are so much lighter than those heretofore used they can be increased in diameter, and thus reduced in number, whereby there are fewer tines to become entangled with the mass of vines and less friction to be overcome in the operation of gathering the berries. A coarse comb is easier to use than a fine one.

Fig. 8 shows a form of scoop known as a "gatherer," in which my improved tines are substituted for those usually used. Its principal features are a series of my improved tines A', a berry-receptacle B', of which said tines form the bottom, and a berry-stripper C', secured to arms D', that are pivoted to the back E' of receptacle B'. The stripper C' extends across the front of the receptacle and when depressed lies in front of and close to the free ends of the tines. A top F' covers the rear of the receptacle, while a screen G' covers the space between the front of the top F' and the stripper C'. Springs H H raise the stripper from its depressed position. To use the gatherer, its tines are pushed forward under the vines and then after depressing the stripper withdrawn, (not raised up, as is the scoop,) thus catching the berries between the bar and the tines and stripping them off the vines.

In short, I have provided a tine longer, larger in diameter, and lighter in weight than any heretofore known to me and have thereby produced cranberry scoops and gatherers possessing both increased gathering capacity and ease of operation.

What I claim is—

A cranberry-scoop made up of a receptacle; a cross-bar formed with a plurality of sockets; a plurality of hollow tines, the butt-ends of which engage in said sockets; plugs in said butt-ends; and pins extending through said cross-bar into said plugs to hold said hollow pins.

In testimony whereof I affix my signature in presence of two witnesses.

WILLIAM T. MAKEPEACE.

Witnesses:
N. B. NICKERSON,
M. B. CROCKER.